United States Patent
Yanase et al.

(10) Patent No.: US 8,076,007 B2
(45) Date of Patent: Dec. 13, 2011

(54) MULTILAYERED SLIDING MEMBER

(75) Inventors: Sumihide Yanase, Kanagawa (JP); Toshihiko Sekine, Kanagawa (JP); Masafumi Kugo, Kanagawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 11/794,309

(22) PCT Filed: Dec. 19, 2005

(86) PCT No.: PCT/JP2005/023274
§ 371 (c)(1), (2), (4) Date: Jun. 27, 2007

(87) PCT Pub. No.: WO2006/075481
PCT Pub. Date: Jul. 20, 2006

(65) Prior Publication Data
US 2007/0269674 A1    Nov. 22, 2007

(30) Foreign Application Priority Data
Jan. 17, 2005    (JP) .................................. 2005-008651

(51) Int. Cl.
*B32B 3/24* (2006.01)
*B32B 3/14* (2006.01)
*B32B 15/08* (2006.01)
*B22F 3/10* (2006.01)

(52) U.S. Cl. ........ 428/550; 428/613; 428/674; 428/684; 428/457

(58) Field of Classification Search ........................ None
See application file for complete search history.

(56) References Cited

U.S. PATENT DOCUMENTS

| | | | |
|---|---|---|---|
| 2,689,380 A | | 9/1954 | Tait |
| 5,300,366 A | * | 4/1994 | Nakamaru et al. ............ 428/549 |
| 5,616,406 A | * | 4/1997 | Nakamaru et al. ............ 442/19 |
| 5,732,322 A | * | 3/1998 | Nakamaru et al. ............ 428/550 |
| 5,938,864 A | * | 8/1999 | Tomikawa et al. ........... 148/435 |
| 6,548,188 B1 | * | 4/2003 | Yanase et al. ................. 428/626 |
| 2006/0062503 A1 | * | 3/2006 | Iwata ............................ 384/300 |
| 2007/0021544 A1 | * | 1/2007 | Yanase et al. ................. 524/423 |

FOREIGN PATENT DOCUMENTS

JP    31-2452    4/1956

(Continued)

OTHER PUBLICATIONS

Mitsubishi Chemical Industries web page on Carbon Black http://www.carbonblack.jp/en/cb/index.html and http://www.carbonblack.jp/en/cb/tokusei.html (2006).*

(Continued)

*Primary Examiner* — Jennifer McNeil
*Assistant Examiner* — Jason Savage
(74) *Attorney, Agent, or Firm* — Nixon & Vanderhye P.C.

(57) ABSTRACT

A multilayered sliding member has a resin composition filled in pores of, and coated on the surface of, a porous sintered metal layer 2 formed on the surface of a metallic backing plate 1. The resin composition is formed by compounding a phosphate, a carbon black, a melt moldable fluororesin, and a PTFE serving as a principal component, and is preferably formed by further containing graphite and/or a low molecular weight PTFE.

4 Claims, 1 Drawing Sheet

FOREIGN PATENT DOCUMENTS

| | | |
|---|---|---|
| JP | 41-1868 | 2/1966 |
| JP | 61-028846 | 2/1986 |
| JP | 61-053349 | 3/1986 |
| JP | 62-33275 | 7/1987 |
| JP | 05-296233 | 11/1993 |
| JP | 11-507983 | 7/1999 |
| JP | 2000-169738 | 6/2000 |
| JP | 2001-271083 | 10/2001 |

OTHER PUBLICATIONS (WO 00/17273 English Abstract from Derwent), Nishihata et al, Sliding Member for Converyor Apparatus, Mar. 2000.*

JP 2003-097571 English Machine Translation, Koutetsu et al, Apr. 2003.*

International Search Report for PCT/JP2005/023274 mailed Mar. 28, 2006 (English and Japanese).

* cited by examiner

[Fig. 1]
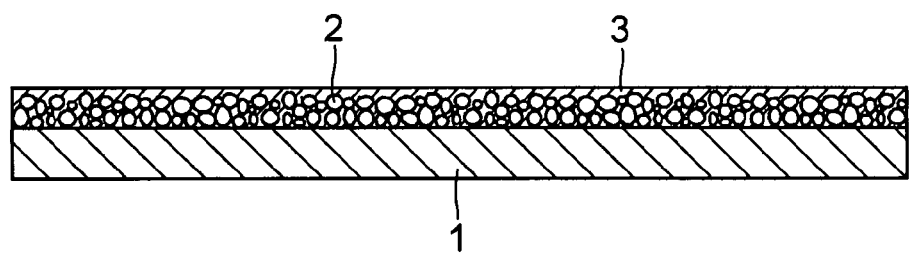

MULTILAYERED SLIDING MEMBER

This application is the U.S. national phase of International Application No. PCT/JP2005/023274 filed 19 Dec. 2005, which designated the U.S. and claims priority to JP 2005-008651 filed 17 Jan. 2005, the entire contents of each of which are hereby incorporated by reference.

TECHNICAL FIELD

The present invention relates to a multilayered sliding member exhibiting excellent frictional wear properties in use under hydrodynamic lubrication, mixed lubrication, or boundary lubrication conditions.

BACKGROUND ART

Patent document 1: U.S. Pat. No. 2,689,380
Patent document 2: JP-B-31-2452
Patent document 3: JP-B-41-1868
Patent document 4: JP-B-61-28846
Patent document 5: JP-B-62-33275

Polytetrafluoroethylene resins (hereafter abbreviated as PTFE) are widely used in sliding members such as bearings since they excel in self-lubricating properties and have low coefficients of friction and high chemical and heat resistance. However, a sliding member made of PTFE alone is poor in wear resistance and a load carrying capacity, so that the defects of the PTFE are compensated for by adopting the following measures according to the application of use of the sliding member: (a) incorporating into the PTFE a solid lubricant such as graphite, molybdenum disulfide, or the like and/or a reinforcing material such as glass fibers or carbon fibers, and (b) filling the PTFE in the pores of a porous sintered metal layer formed on a steel backing plate and coating the surface of the porous sintered metal layer therewith.

The sliding member having the above-described form (b) is so called a multilayered sliding member, and multilayered sliding members have been proposed in which PTFE or the PTFE containing a filler composed of lead or a lead oxide is filled in the pores of a porous sintered metal layer formed on a steel backing plate and is coated on the surface of the porous sintered metal layer (refer to patent documents 1, 2, and 3).

In addition, a multilayered sliding member has also been proposed in which a melt moldable fluororesin composed of a tetrafluoroethylene-hexafluoropropylene copolymer or a tetrafluoroethylene-perfluoroalkylvinylether copolymer is contained in the PTFE as another filler (refer to Patent documents 4 and 5).

DISCLOSURE OF THE INVENTION

Problems to be Solved by the Invention

In the above-described various sliding members, fillers are selected which are suited to respective working conditions including numerous different working conditions, for example under hydrodynamic lubrication, mixed lubrication, or boundary lubrication conditions, and therefore, it is difficult to say that these sliding members satisfy all of these working conditions.

In addition, in the PTFE composition for a sliding member, attempts have been made to use, for example, graphite, molybdenum disulfide or other metal sulfide, a metal oxide, or inorganic fibers such as glass fibers and carbon fibers, which are used as fillers for numerous engineering plastics. However, although these fillers, in fact, contribute to the improvement of the wear resistance of the resin layer, they often cause the problem of hampering the low frictional properties peculiar to PTFE. In particular, lead as the filler is widely used as it improves the wear resistance of the resin layer without hampering the low frictional properties inherent to PTFE. However, from the secondary standpoint of such as the environmental pollution and public hazards in recent years, the situation is such that there is no other alternative than to abandon the use of it.

The present invention has been devised in view of the above-described aspects, and its object is to provide a multilayered sliding member excelling in frictional wear properties under numerous different working conditions, such as under hydrodynamic lubrication, mixed lubrication, or boundary lubrication conditions.

Means for Solving the Problems

As a result of the present inventors' earnest studies for attaining the above-described object, it has been found that a multilayered sliding member which comprises a resin composition filled in pores of, and coated on the surface of, a porous sintered metal layer formed on the surface of a steel backing plate, and which uses the resin composition having specific amounts of a phosphate, a carbon black, and a melt moldable fluororesin compounded in a PTFE or further containing at least one of graphite, molybdenum disulfide, and a low molecular weight PTFE in a predetermined amount, is capable of exhibiting excellent frictional wear properties under different working conditions, such as under hydrodynamic lubrication, mixed lubrication, or boundary lubrication conditions.

The present invention has been completed on the basis of this finding. Its first gist resides in a multilayered sliding member comprising a resin composition filled in pores of, and coated on a surface of, a porous sintered metal layer formed on a surface of a metallic backing plate, the resin composition comprising 3 to 25% by weight of a phosphate, 0.3 to 3% by weight of a carbon black, 3 to 30% by weight of a melt moldable fluororesin, and the balance of PTFE.

Further, a second gist resides in a multilayered sliding member wherein the resin composition contains 1 to 5% by weight of graphite or 2 to 10% by weight of molybdenum disulfide and/or 3 to 15% by weight of a low molecular weight PTFE.

Advantageous Effect of the Invention

According to the present invention, a multilayered sliding member is provided which exhibits excellent frictional wear properties under different working conditions, such as under hydrodynamic lubrication, mixed lubrication, or boundary lubrication conditions.

Hereafter, a detailed description will be given of the present invention.

BRIEF DESCRIPTION OF THE DRAWING

FIG. 1 is a cross-sectional view illustrating an embodiment of a multilayered sliding member in accordance with the invention.

BEST MODE FOR CARRYING OUT THE INVENTION

The multilayered sliding member in accordance with the invention comprises a resin composition filled in the pores of, and coated on the surface of, a porous sintered metal layer formed on the surface of a metallic backing plate. The resin composition is formed by compounding a phosphate, a carbon black, a melt moldable fluororesin, and a PTFE serving as a principal component, and is preferably formed by further containing graphite or molybdenum disulfide and/or a low molecular weight PTFE.

The phosphate used in itself exhibits no lubricity, but by being compounded with a mixture of the PTFE, the carbon black, and the melt moldable fluororesin, the phosphate exhibits the effects of promoting the formation on the surface of a mating member of a mixed film consisting of the PTFE, the carbon black, and the melt moldable fluororesin in sliding on the mating member, enhancing its retentivity on the surface of the mating member, and enhancing the durability.

The compounding amount of the phosphate is normally 3 to 25% by weight, preferably 10 to 20% by weight. If the compounding amount is less than 3% by weight, the effects of formability on the surface of the mating member of the mixed film consisting of the PTFE, the carbon black, and the melt moldable fluororesin, its retentivity on the surface of the mating member, and the durability of the mixed film are not exhibited. Meanwhile, if the compounding amount is more than 25% by weight, a problem arises in the formability of the mixed film on the surface of the mating member, so that the formation of a satisfactory mixed film on the surface of the mating member becomes difficult, with the result that the frictional wear properties can deteriorate.

As the phosphate, it is possible to cite metal salts of such as orthophosphoric acid, pyrophosphoric acid, and metaphosphoric acid, and a mixture thereof. Among them, the metal salts of pyrophosphoric acid and metaphosphoric acid are preferable. As the metal, an alkali metal and an alkaline earth metal are preferable, and calcium (Ca) and magnesium (Mg) are more preferable. Specifically, it is possible to cite by way of example calcium pyrophosphate ($Ca_2P_2O_7$), magnesium pyrophosphate ($Mg_2P_2O_7$), calcium metaphosphate ($[Ca(PO_3)_2]n$), magnesium metaphosphate ($[Mg(PO_3)_2]n$), aluminum metaphosphate ($[Al(PO_3)_3]n$), and the like. Among them, calcium metaphosphate ($[Ca(PO_3)_2]n$) and magnesium metaphosphate ($[Mg(PO_3)_2]n$) are preferable since they exhibit the above-described effects most satisfactorily.

The carbon black exhibits the effects of reinforcing the PTFE constituting the principal component and of improving the wear resistance. In addition, since it possesses the property of retaining oil, even under the boundary or mixed lubrication conditions where an oil or grease shortage is likely to occur in oil or grease lubrication, it is possible to retain the oil content and prevent the occurrence of a defect such as seizure due to the oil shortage.

The compounding amount of the carbon black is normally 0.3 to 3% by weight, preferably 0.5 to 2% by weight. If the compounding amount is less than 0.3% by weight, the above-described effects are not exhibited sufficiently. Meanwhile, if the compounding amount is more than 3% by weight, its proportion in the resin composition becomes large and can lower the wear resistance to the contrary.

As the carbon black, it is possible to cite acetylene black, oil furnace black, thermal black, channel black, gas furnace black, and the like. In particular, preferable is one whose primary particle size is less than approximately 200 nm, preferably 10 nm to 100 nm, whose DBP absorption is not less than 100 ml/100 g, preferably not less than 300 ml/100 g, which has a hollow structure and is provided with a kind of a porous structure, and which has an appropriate chain structure. Specifically, it is possible to cite by way of illustration "Ketjenblack EC (tradename)" and "Ketjenblack EC-600JD (tradename)" manufactured by KETJENBLACK INTERNATIONAL COMPANY as being preferable ones.

The melt moldable fluororesin exhibits the effects of reinforcing the PTFE by being mutually dissolved with the PTFE constituting the principal component and of improving the wear resistance which is the drawback of the PTFE.

The compounding amount of the melt moldable fluororesin is normally 3 to 30% by weight, preferably 5 to 15% by weight. If the compounding amount is less than 3% by weight, the above-described effects are not exhibited sufficiently. Meanwhile, if the compounding amount is more than 30% by weight, the amount of the melt moldable fluororesin becomes large and impairs the low frictional properties peculiar to the PTFE although the wear resistance is further improved.

As the melt moldable fluororesin, it is possible to cite a tetrafluoroethylene-hexafluoropropylene copolymer (hereafter abbreviated as the FEP) or a tetrafluoroethylene-perfluoroalkylvinylether copolymer (hereafter abbreviated as the PFA). Specifically, it is possible to cite by way of example "NEOFLON FEP (tradename)" manufactured by Daikin Industries, Ltd. as the FEP and "Teflon® MP powder" manufactured by DU PONT-MITSUI FLUOROCHEMICALS COMPANY, LTD. as the PFA.

As the PTFE constituting the principal component of the resin composition, a PTFE for fine powder is used. Specifically, it is possible to cite "Teflon® 6CJ" or the like manufactured by DU PONT-MITSUI FLUOROCHEMICALS COMPANY, LTD., "POLYFLON F201 (tradename)" or the like manufactured by Daikin Industries, Ltd., "Fluon CD076 (tradename)," "Fluon CD090 (tradename)," or the like manufactured by Asahi Glass Co., Ltd.

The compounding amount of the PTFE in the resin composition is the remaining amount obtained by subtracting the compounding amounts of the fillers from the amount of the resin composition, and is preferably not less than 50% by weight, more preferably 50 to 75% by weight.

In the resin composition in the multilayered sliding member of the invention, 1 to 5% by weight of graphite or 2 to 10% by weight of molybdenum disulfide may be compounded for the purposes of further improving the wear resistance and improving the affinity with lubricating oil.

In addition, the resin composition in the multilayered sliding member of the invention may contain 3 to 15% by weight of a low molecular weight PTFE for the purpose of improving the affinity in an early period of sliding with the mating member. The low molecular weight PTFE is a PTFE whose molecular weight is reduced by decomposing a high molecular weight PTFE (molding powder or fine powder) by such as exposure to radiation or by controlling the molecular weight during the polymerization of the PTFE. Specifically, it is possible to cite "TLP-10F (tradename)" or the like manufactured by DU PONT-MITSUI FLUOROCHEMICALS COMPANY, LTD., "Lubron L-5 (tradename)" or the like manufactured by Daikin Industries, Ltd., "Fluon L169J (tradename)" or the like manufactured by Asahi Glass Co., Ltd., and "KTL-8N (tradename)" or the like manufactured by KITAMURA LIMITED.

Next, a description will be given of a method of manufacturing the metallic backing plate, the porous sintered metal layer formed integrally on the surface of this backing plate, and the multilayered sliding member having a resin composition filled in the pores of, and coated on the surface of, the porous sintered metal layer. The metallic backing plate is used by being appropriately selected from a cold-rolled steel plate (SPCC), a pure copper plate of such as oxygen free copper (type 1 or type 2 of oxygen free copper billets and cakes defined in JIS-H-2123) or tough pitch copper (tough pitch copper billets and cakes defined in JIS-H-2123), and a copper alloy plate of such as phosphor bronze, depending on the application. As for the metallic backing plate, it is preferable to use a continuous strip which is provided as a hoop wound in coil form, but the metallic backing plate is not necessarily limited to the continuous strip, and it is also possible to use a strip cut to an appropriate length. In the case where such a strip or a steel plate, in particular, is used, the plate may be provided with such as copper plating or tin plating, as required, to improve corrosion resistance.

The metal powder for forming the porous sintered metal layer is formed of a copper alloy excelling in frictional wear properties, such as bronze or phosphor bronze, but may be formed of, for instance, an aluminum alloy or iron other than the copper alloy, depending on the purpose and application. As the form of particles of these metal powders, it is possible to use a metal powder having massive shape, spherical shape, or other irregular shapes. Their particle size is preferably of such a degree that the particles pass through an 80-mesh sieve but do not pass through a 350-mesh sieve. It is required that the metal powder particles of the porous sintered metal layer are strongly bonded to each other and the sintered metal layer is strongly bonded to the aforementioned steel plate strip, and that the sintered metal layer has a predetermined thickness and the required porosity. The thickness of the porous sintered metal layer is generally 0.15 to 0.40 mm, preferably 0.2 to 0.3 mm. The porosity of the porous sintered metal layer is generally not less than 10% by volume, preferably 15 to 40% by volume.

A resin composition with wettability imparted thereto can be obtained by a method in which the PTFE and the aforementioned fillers are mixed, and a petroleum-based solvent is then added to the resultant mixture and is mixed under stirring. The mixing of the PTFE and the fillers is effected at a temperature not more than the room-temperature transition point (19° C.) of the PTFE, preferably from 10 to 18° C. Further, the resultant mixture and the petroleum-based solvent are also mixed under stirring at the same temperature as described above. By the adoption of such a temperature condition, fibrillation of the PTFE can be inhibited, thereby making it possible to obtain a homogeneous mixture.

As the petroleum-based solvent, naphtha, toluene, xylene, or a mixed solvent of an aliphatic solvent or a naphthenic solvent is used. The ratio of the petroleum-based solvent used is from 15 to 30 parts by weight based on 100 parts by weight of a mixture of the PTFE powder and the fillers. If the ratio of the petroleum-based solvent used is less than 15 parts by weight, the ductility of the resin composition with the wettability imparted thereto is poor in the below-described filling and coating step of the porous sintered metal layer, so that uneven filling and coating of the sintered layer is likely to occur. On the other hand, if the ratio of the petroleum-based solvent used exceeds 30 parts by weight, not only does the filling and coating operation become difficult, but the uniformity of the coating thickness of the resin composition can be impaired, and the adhesion strength between the resin composition and the sintered layer becomes deteriorated.

The sliding member in accordance with the present invention is produced through the following steps (a) to (d).

(a) A resin composition with wettability imparted thereto is supplied by being spread over a porous sintered metal layer formed on a metallic backing plate selected from a steel plate and a copper or copper alloy plate, and is subjected to rolling by a roller, thereby filling the resin composition into pores of the porous sintered metal layer and forming on the surface of the porous sintered metal layer a coating layer composed of the resin composition having a uniform thickness. In this step, the thickness of the coating layer is set to from 2 to 2.2 times the coating layer thickness required for the resin composition in a final product. The filling of the resin composition into pores of the porous sintered metal layer substantially proceeds in this step.

(b) The backing plate thus treated in the step (a) is held in a drying furnace heated to a temperature of from 200 to 250° C. for several minutes to remove the petroleum-based solvent. Then, the dried resin composition is subjected to pressure roller treatment using a roller under a pressure of 300 to 600 kgf/cm$^2$ to obtain the predetermined thickness of the coating layer.

(c) The backing plate thus treated in the step (b) is introduced into a heating furnace, and heated at a temperature of from 360 to 380° C. for a period between several minutes and 10 and several minutes to sinter the resin composition. Then, the backing plate is removed out of the heating furnace and is subjected to roller treatment again to adjust the variation of the size.

(d) The backing plate subjected to the size adjustment in the step (c) is cooled (air-cooled or naturally cooled), and then subjected to correction roller treatment, as required, so as to correct the waviness or the like of the backing plate, thereby obtaining a desired sliding member.

In the sliding member obtained through the steps (a) to (d), the thickness of the porous sintered metal layer is set to 0.10 to 0.40 mm, and the thickness of the coating layer formed of the resin composition is set to 0.005 to 0.15 mm. The sliding member thus obtained is cut into an appropriate size, and is used as a flat sliding plate, or used as a cylindrical winding bush by being bent round.

EXAMPLES

Hereafter, a detailed description will be given of the present invention with reference to examples. However, these examples are merely illustrative and not intended to limit the invention thereto. In the following examples, the frictional wear properties of the multilayered sliding members were evaluated by the following test methods (1) and (2).

In-oil thrust test (1): The coefficient of friction and the amount of wear were measured under the conditions listed in Table 1. Then, the coefficient of friction shows the coefficient of friction measured during the time of stability from one hour after the start of the test until the completion of the test. Further, the amount of wear shows the amount of dimensional change of the sliding surface after completion of the test.

TABLE 1

| | |
|---|---|
| Sliding velocity: | 5 m/min. |
| Load: | 300 kgf/cm$^2$ |
| Test time: | 8 hrs. |
| Lubricating oil: | ester oil (kinematic viscosity: 25 mm$^2$/s (40° C.)) |
| Mating member: | carbon steel for machine structural use (S45C) |

In-oil thrust test (2): The coefficient of friction and the amount of wear were measured under the conditions listed in Table 2. Then, the coefficient of friction shows the coefficient of friction measured during the time of stability from one hour after the start of the test until the completion of the test. Further, the amount of wear shows the amount of dimensional change of the sliding surface after completion of the test.

TABLE 2

| | |
|---|---|
| Sliding velocity: | 1 m/min. |
| Load: | 300 kgf/cm$^2$ |
| Test time: | 8 hrs. |
| Lubricating oil: | ester oil (kinematic viscosity: 25 mm$^2$/s (40° C.)) |
| Mating member: | carbon steel for machine structural use (S45C) |

Examples 1 to 18 and Comparative Examples 1 to 4

In the following examples and comparative examples, "POLYFLON F201 (tradename)" manufactured by Daikin Industries, Ltd. was used as the PTFE, and a mixed solvent of an aliphatic solvent and a naphthenic solvent ("Exxsol (tradename)" manufactured by Exxon Chemical Company) was used as the petroleum-based solvent.

First, the PTFE and the fillers shown in Tables 3 to 7 were charged into a Henschel mixer, and mixed under stirring. 20 parts by weight of the petroleum-based solvent was compounded with 100 parts by weight of the resultant mixture, and mixed at a temperature (15° C.) lower than the room-temperature transition point of the PTFE, to obtain a resin composition.

The resin composition thus obtained was spread over a porous sintered metal (bronze) layer formed on the surface of a backing plate formed of a steel plate, and rolled by a roller for filling the resin composition into pores of the porous sintered metal layer and coating the surface of the porous sintered metal layer therewith, thereby obtaining a multilayered plate having a resin composition layer on the porous sintered metal layer. This multilayered plate was held in a hot-air drying furnace heated to 200° C. for 5 minutes to remove the solvent. Then, the dried multilayered plate was rolled under a pressure by a roller, such that the thickness of the resin composition layer coated on the porous sintered metal layer was set to 10 μm (0.01 mm).

The multilayered plate thus pressure-treated was then introduced into a heating furnace, and heated at a temperature of 370° C. for 10 minutes to sinter the resin composition. Subsequently, the plate was subjected to pressure treatment again by the roller to make the dimensional adjustment and correction of the waviness and the like, thereby fabricating a multilayered sliding member. The multilayered sliding member, upon completion of the correction, was cut to obtain a multilayered sliding member test piece having each side length of 30 mm. FIG. 1 shows a cross-sectional view of the multilayered sliding member thus obtained. In the drawing, reference numeral 1 denotes a metallic backing plate formed of a steel plate; 2 denotes a porous sintered metal layer; and 3 denotes a coating layer (sliding layer) composed of the resin composition filling pores of the porous sintered metal layer 2 and coating the surface of the porous sintered metal layer 2.

The results of the thrust tests (1) and (2) for each of the multilayered sliding members are shown in Tables 3 to 7. The compounding amounts in the tables are shown by "% by weight". It should be noted that "Ketjenblack EC-600JD (tradename)" manufactured by KETJENBLACK INTERNATIONAL COMPANY was used as the carbon black, and "NEOFLON FEP (tradename)" manufactured by Daikin Industries, Ltd. and "Teflon® MP powder" manufactured by DU PONT-MITSUI FLUOROCHEMICALS COMPANY, LTD. were used as the melt moldable fluororesins.

TABLE 3

| | Examples | | | |
|---|---|---|---|---|
| | 1 | 2 | 3 | 4 |
| PTFE | 73.5 | 73 | 72.5 | 72 |
| Phosphate | | | | |
| Magnesium metaphosphate | 16 | — | 16 | — |
| Calcium pyrophosphate | — | 16 | — | 16 |
| Carbon black | 0.5 | 1 | 1.5 | 2 |
| Melt moldable fluororesin | | | | |
| FEP | — | 10 | — | 10 |
| PFA | 10 | — | 10 | — |
| Graphite | — | — | — | — |
| Molybdenum disulfide | — | — | — | — |
| Low molecular weight PTFE | — | — | — | — |
| Thrust Test (1) | | | | |
| Coefficient of friction | 0.011 | 0.012 | 0.010 | 0.010 |
| Amount of wear (μm) | 9 | 9 | 8 | 8 |
| Thrust Test (2) | | | | |
| Coefficient of friction | 0.086 | 0.082 | 0.080 | 0.086 |
| Amount of wear (μm) | 20 | 18 | 18 | 19 |

TABLE 4

| | Examples | | | |
|---|---|---|---|---|
| | 5 | 6 | 7 | 8 |
| PTFE | 71 | 68.5 | 69 | 64 |
| Phosphate | | | | |
| Magnesium metaphosphate | 16 | 16 | 16 | — |
| Calcium pyrophosphate | — | — | — | 16 |
| Carbon black | 1 | 1.5 | 1 | 2 |
| Melt moldable fluororesin | | | | |
| FEP | — | — | — | 10 |
| PFA | 10 | 10 | 10 | — |
| Graphite | 2 | 4 | — | — |
| Molybdenum disulfide | — | — | 4 | 8 |
| Low molecular weight PTFE | — | — | — | — |
| Thrust Test (1) | | | | |
| Coefficient of friction | 0.009 | 0.009 | 0.006 | 0.005 |
| Amount of wear (μm) | 8 | 8 | 8 | 9 |
| Thrust Test (2) | | | | |
| Coefficient of friction | 0.078 | 0.068 | 0.073 | 0.068 |
| Amount of wear (μm) | 18 | 16 | 17 | 17 |

TABLE 5

| | Examples | | | |
|---|---|---|---|---|
| | 9 | 10 | 11 | 12 |
| PTFE | 63 | 62 | 63.5 | 63 |
| Phosphate | | | | |
| Magnesium metaphosphate | 16 | 16 | 14 | 14 |
| Calcium pyrophosphate | — | — | — | — |
| Carbon black | 1 | 2 | 0.5 | 1 |
| Melt moldable fluororesin | | | | |
| FEP | — | — | — | — |
| PFA | 10 | 10 | 10 | 10 |
| Graphite | — | — | 2 | 2 |
| Molybdenum disulfide | — | — | — | — |
| Low molecular weight PTFE | 10 | 10 | 10 | 10 |

TABLE 5-continued

| | Examples | | | |
|---|---|---|---|---|
| | 9 | 10 | 11 | 12 |
| Thrust Test (1) | | | | |
| Coefficient of friction | 0.008 | 0.009 | 0.007 | 0.006 |
| Amount of wear (μm) | 8 | 8 | 6 | 7 |
| Thrust Test (2) | | | | |
| Coefficient of friction | 0.070 | 0.078 | 0.060 | 0.050 |
| Amount of wear (μm) | 19 | 17 | 14 | 14 |

TABLE 6

| | Examples | | | | | |
|---|---|---|---|---|---|---|
| | 13 | 14 | 15 | 16 | 17 | 18 |
| PTFE | 60.5 | 60 | 61.5 | 61 | 56.5 | 58 |
| Phosphate | | | | | | |
| Magnesium metaphosphate | 14 | 16 | 14 | 14 | 14 | 16 |
| Calcium pyrophosphate | — | — | — | — | — | — |
| Carbon black | 1.5 | 2 | 0.5 | 1 | 1.5 | 2 |
| Melt moldable fluororesin | | | | | | |
| FEP | — | — | — | — | — | — |
| PFA | 10 | 10 | 10 | 10 | 10 | 10 |
| Graphite | 4 | 2 | — | — | — | — |
| Molybdenum disulfide | — | — | 4 | 4 | 8 | 4 |
| Low molecular weight PTFE | 10 | 10 | 10 | 10 | 10 | 10 |
| Thrust Test (1) | | | | | | |
| Coefficient of friction | 0.008 | 0.006 | 0.006 | 0.006 | 0.005 | 0.005 |
| Amount of wear (μm) | 6 | 7 | 7 | 8 | 8 | 8 |
| Thrust Test (2) | | | | | | |
| Coefficient of friction | 0.042 | 0.040 | 0.073 | 0.022 | 0.030 | 0.021 |
| Amount of wear (μm) | 12 | 12 | 12 | 9 | 10 | 10 |

TABLE 7

| | Comparative Examples | | | |
|---|---|---|---|---|
| | 1 | 2 | 3 | 4 |
| PTFE | 70 | 80 | 71 | 64 |
| Phosphate | | | | |
| Magnesium metaphosphate | — | — | — | — |
| Calcium pyrophosphate | — | — | 14 | 16 |
| Melt moldable fluororesin | | | | |
| FEP | — | — | — | — |
| PFA | — | 20 | 10 | 10 |
| Graphite | — | — | 5 | 10 |
| Low molecular weight PTFE | — | — | — | — |
| Lead | 30 | — | — | — |
| Thrust Test (1) | | | | |
| Coefficient of friction | 0.120 | 0.027 | 0.080 | 0.042 |
| Amount of wear (μm) | 153 | 54 | 30 | 28 |
| Thrust Test (2) | | | | |
| Coefficient of friction | 0.131 | 0.034 | 0.128 | 0.022 |
| Amount of wear (μm) | 97 | 30 | 44 | 32 |

From the above-described test results, the multilayered sliding members in the examples of the invention exhibited low coefficients of friction and stable performance and showed very low values as their amounts of wear throughout the test time even under boundary or mixed lubrication conditions. Meanwhile, the multilayered sliding members in the comparative examples showed high coefficients of friction and large amounts of wear, and were inferior in the frictional wear properties.

The invention claimed is:

1. A multilayered sliding member comprising a resin composition filled in pores of, and coated on a surface of, a porous sintered metal layer formed on a surface of a metallic backing plate, said resin composition comprising 3 to 25% by weight of a phosphate which includes a magnesium metaphosphate, 0.3 to 3% by weight of a carbon black selected from acetylene black, oil furnace black, thermal black, channel black, or gas furnace black, which has a hollow structure, a porous structure, and a chain structure, whose DBP absorption is not less than 100 ml/100 g, 3 to 30% by weight of a melt moldable fluororesin selected from a tetrafluoroethylene-perfluoroalkylvinylether copolymer and a tetrafluoroethylene-hexafluoropropylene copolymer, 3 to 15% by weight of a low molecular weight polytetrafluoroethylene resin, and the balance of a polytetrafluoroethylene resin.

2. The multilayered sliding member according to claim 1, wherein said metallic backing plate is selected from a steel plate and a copper or copper alloy plate.

3. The multilayered sliding member according to claim 1, wherein said resin composition contains 1 to 5% by weight of graphite as an additional component.

4. The multilayered sliding member according to claim 1, wherein said resin composition contains 2 to 10% by weight of molybdenum disulfide as an additional component.

* * * * *